F. X. RATKOVIC.
PLANTING MACHINE.
APPLICATION FILED DEC. 12, 1919.
1,405,866.
Patented Feb. 7, 1922.
2 SHEETS—SHEET 2.
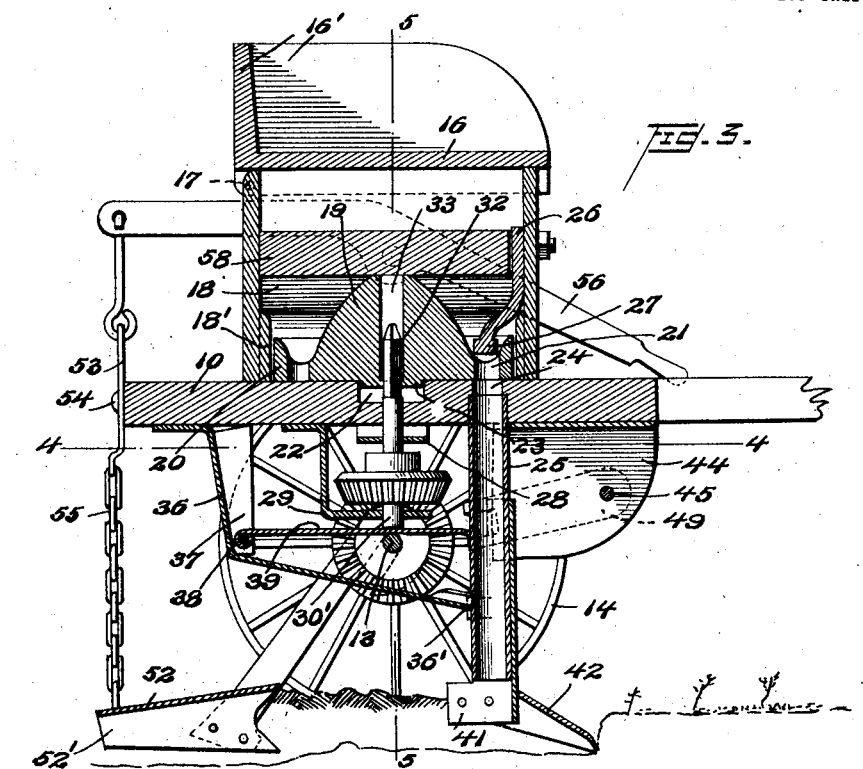
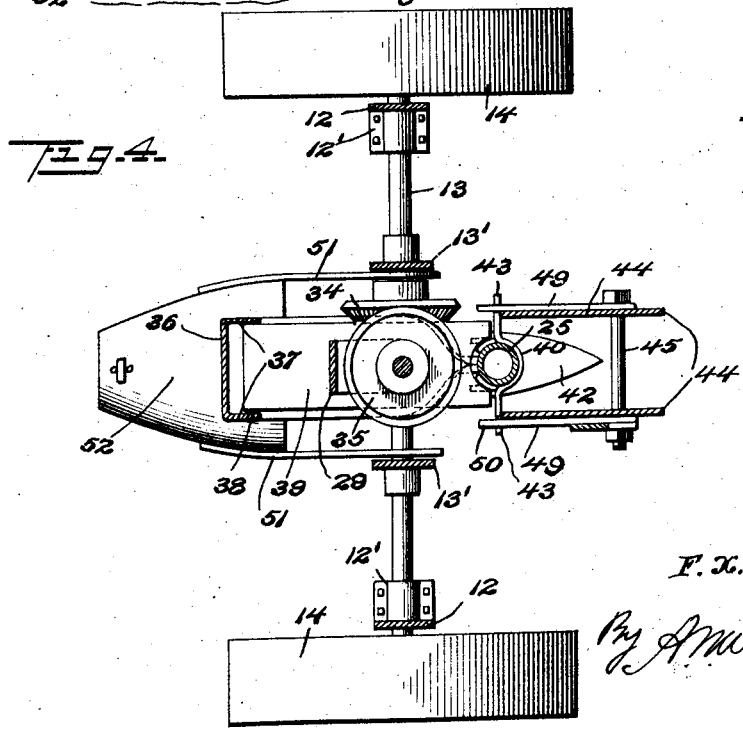
Inventor
F. X. Ratkovic
By A. M. Wilson
Attorney

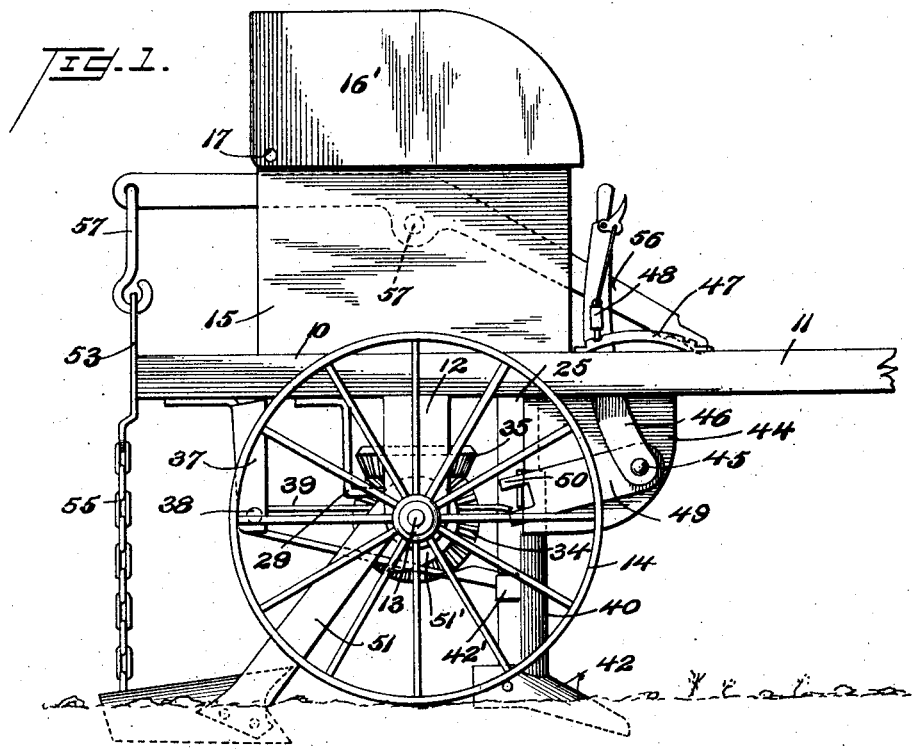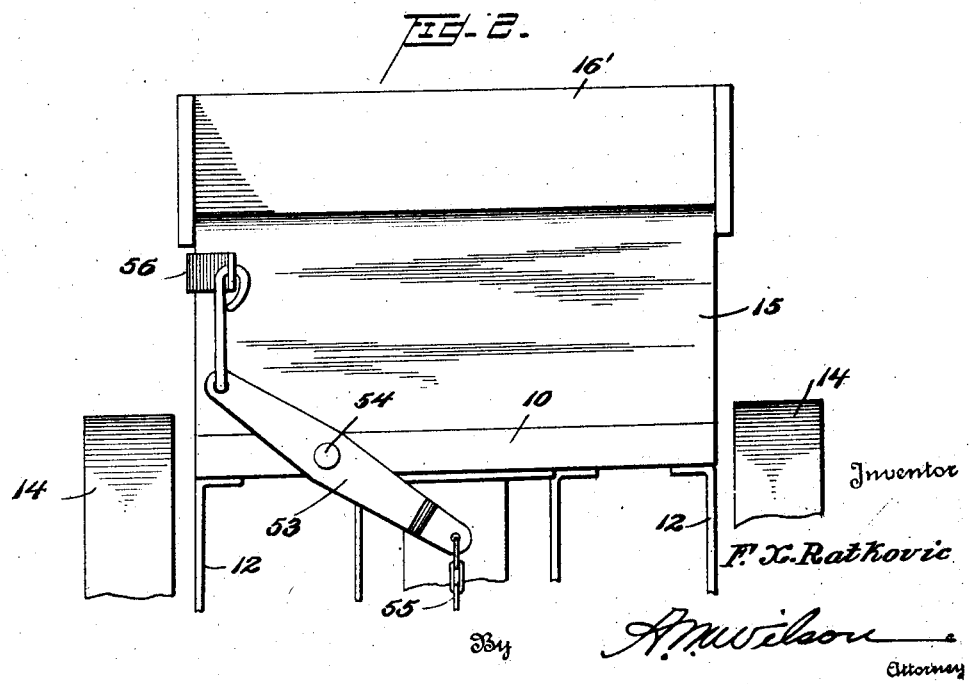

UNITED STATES PATENT OFFICE.

FRANK X. RATKOVIC, OF ETNA, PENNSYLVANIA.

PLANTING MACHINE.

1,405,866.  Specification of Letters Patent.  Patented Feb. 7, 1922.

Application filed December 12, 1919. Serial No. 344,277.

*To all whom it may concern:*

Be it known that I, FRANK X. RATKOVIC, a citizen of the United States of America, residing at Etna, in the county of Allegheny and State of Pennsylvania, have invented certain new and useful Improvements in Planting Machines, of which the following is a specification.

The primary object of the present invention has particular reference to an agricultural machine especially designed for the planting of potatoes and beans, or for the planting of seeds of any type wherein the forward travel of the machine controls the seed delivery mechanism for the deposit of a single seed when the machine is in operation.

A further object of the invention includes in a seed planting machine, mechanism for controlling the supply of seeds to be planted with means for rendering the feeding devices inoperative when desired.

A still further object of the invention embodies in a planting machine, trenches associated with seed chutes with manually controlled earth covering devices arranged rearwardly of the trenches for covering the deposited seeds.

With the above and other objects in view, this invention consists in the novel form, combination and arrangement of parts herein fully described and shown in the accompanying drawings, wherein like reference characters indicate similar parts throughout the several views.

In the drawings,

Figure 1 is a side elevational view of a planting machine constructed in accordance with the present invention, the horse hitching shafts being broken away, Figure 2 is a fragmentary rear elevational view of the device illustrating the elevating arm attached to the platform for elevating and lowering the trench filling scoop, Figure 3 is a vertical longitudinal sectional view through the planting means, Figure 4 is a cross sectional view taken on line 4—4 of Figure 3, Figure 5 is a detail perspective view of the trencher carrying the tubular slide detached from the seed chute.

Briefly described, the present invention embodies an agricultural machine designed for the planting of seed and wherein there is provided a frame for supporting a seed hopper with a delivery chute depending from the hopper. Seed delivery devices positioned in the hopper are operable from the supporting axle of the ground wheels and are adapted to be rendered inoperative by the shifting of a portion of the operating mechanism. A covering device is supported on the frame and travels rearwardly of the seed delivery chute and directs the covering of earth over the deposited seeds.

Referring more in detail to the accompanying drawings, there is illustrated a construction of vehicle embodying a platform section 10 having forwardly directed shafts 11 partially broken away and to which the draft animal may be attached. Oppositely disposed hangers 12 depend from the sides of the platform 10 and have bearings 12' formed at the lower ends thereof and through which the axle 13 is journalled, with ground engaging wheels 14 fixed to the opposite ends thereof. Inwardly positioned hanger bearings 13' depend from the platform 10 for further supporting the axle 13.

A seed hopper 15 is mounted upon the platform 10 and has a cover 16 hinged to the rear wall thereof as at 17 and provided with side boards 16' forming a seat structure overlying the hopper.

The seed delivery mechanism within the hopper 15 includes a false bottom 18 declined from opposite ends of the hopper toward the center thereof and formed at its central point with a circular wall 18'. A circular block is rotatably mounted within the circular recess 18' of the false bottom and embodies a central conical portion 19 having a peripheral flange 20 at the base thereof with a plurality of spaced seed receiving openings 21 formed in said flange. As shown in Figure 3, the platform 10 beneath the seed delivery block 19 is provided with a circular recess 22 into which a depending circular lug 23 from the block 19 is rotatably received to hold the block 19 centered during rotary movement thereof within the circular wall 18'.

The platform 10 adjacent the front wall of the seed hopper 15 is provided with an opening 24 into which is received, a seed delivery chute 25 permanently retained therein and projecting downwardly through a point adjacent the ground as illustrated. A seed in the hopper 15 is received in the flange opening 21 of the feeding block 19 and by rotation of the block 9, the openings 21 successively register with the seed chute 25 for delivery of the seed contained in the opening to said chute. A bracket 26 is secured to the front wall of the seed hopper 15 and has a curved arm 27 fixed to the lower end thereof and overlying the adjacent portion of the block flange 20 to permit the passage of the seed alone contained in the block opening 21 to be delivered to the chute 25.

The mechanism for rotating the seed feeding block 19 includes the mounting of a pair of brackets 28 and 29 vertically alined with the recess 22 in the platform 10 and in which brackets the shaft 30 is freely rotatably mounted. The shaft 30 freely extends through an opening 31 provided in the platform 10 centrally of the bottom wall of the recess 22 with the upper projecting end of the shaft 30 squared as at 32 for slidable reception in a squared opening provided in the lower extension 23 of the block 19, the block 19 being provided with an axial opening 33 to accommodate the upwardly extending end 32 of the shaft 31. A beveled gear 34 is keyed to the axle 13 at a point spaced inwardly of one of the hanger bearings 13' and is in mesh with the beveled gear 35 fixed upon the shaft 30 intermediate the brackets 28 and 29.

An angular supporting bracket 36 depends from the rear edge of the platform 10 and has its forward end connected as at 36' to the seed chute 25 to constitute a brace for the chute and to hold the same rigidly positioned during the operation of the machine. Side extensions 37 are carried by the upper end of the bracket 36 and have a rod 38 extending therebetween and forming a pivotal point for the lever 39 which extends over the axle 13 and terminates at its forward end adjacent the seed chute 25. As more clearly shown in Figure 3, the lower end 30' of the shaft 30 rests upon the lever 39 and is adapted to be moved to inoperative position in a manner presently to be described.

A trench digger is associated with the seed chute 25 and embodies a tubular member 40 cut away at its rear side and vertically slidable on the chute 25, the lower end of the member 40 being provided with oppositely disposed rearwardly extending lugs 41 adapted to have the trenches 42 connected thereto. The rear edges of the split tubular member 40 at points substantially midway the ends thereof are provided with corresponding rearwardly extending lugs 42' while the upper ends of the rear edges of the member 40 are provided with lateral extensions 43. The operating mechanism for raising and lowering the tubular extension 40 upon the seed chute 25 includes the mounting of an inverted U-shaped frame upon the forward bottom face of the platform 10 with the side walls 44 of said frame having a rod 45 journaled transversely thereof. As shown more clearly in Figure 1, an operating lever 46 is fixed to the rod 45 and is held in adjusted positions relative to the rack 47 by the spring latch 48. An arm 49 is carried by the shaft 45 adjacent each side wall 44 and has the rear bifurcated end 50 enclosing the lateral extension 43 upon the tubular member 40.

A covering device is associated with the trencher 42 and is adapted for covering the seeds deposited in rear of the trenches and includes a pair of arms 51 having the hooked ends 51' loosely received over the axle 13 as more clearly shown in Figures 1 and 4 with a scoop 52 connected to the outer ends thereof, the scoop being relatively wide at its forward end and tapering toward the rear end with curved depending sides 52' for gathering the soil and directing the same into a trench formed immediately in advance thereof. Raising and lowering means is associated with the scoop 52 and includes a lever 53 shown more clearly in Figure 2, pivoted as at 54 to the rear edge of the platform section 10 while a chain 55 connects one end of the lever to the rear end of the scoop 52. A hand lever 56 is pivoted as at 57 to one side of the seed hopper 15 while the rear end thereof has a link connection 57 with the adjacent end of the lever 53.

From the above detailed description of the invention, it is believed that the operation thereof will at once be apparent, it being noted that with the parts positioned as illustrated in Figures 1 and 3, rotation of the axle 13 will impart rotation to the shaft 30 by means of the meshing gears 34 and 35. The upper end of the shaft being squared as at 32 and keyed to the seed block 19, the block 19 is rotated and the seed within the hopper 15 falling by gravity in the block flange openings 21 will be delivered to the seed chute 25 in single members by the regulator arm 27. A plate or partial cover 58 rests upon the upper end of the rotating block 19 and engages the front and rear walls of the seed hopper 15 while the opposite ends thereof are spaced from the inclined ends of the false bottom 18 to prevent the seed within the hopper from entering the block opening 23 and to direct the seed onto the feeding block 19 from opposite ends of the hopper. During the forward travel of the machine, the trencher 42 digs a trench for the reception of seed delivered from the chute 25 while the scoop 52 operating directly rearwardly of the trencher covers the deposited seed to complete the planting operation. When it is desired to transport the machine over a field without operating the mechanism above described, the lever 46 is moved by the operator for shifting the arms 49 upon the shaft 45 and with such movement, the rear bifurcated ends 50 of the arms 49 engaging the lateral extensions 43 of the chute extension member 40, said member 40 is elevated and carries therewith a trencher 42, and the trencher may be elevated to a point above the ground line to render the same inoperative. Simultaneously with the elevating of the trencher 42, the lugs 42' upon the tubular member 40 engage the forward edge of the lever 39 to move the same upwardly upon its pivot 38 and to carry with the lever 39, the vertically movable shaft 30 with a consequent disengagement of the meshing gears 34 and 35. The lever 46 being locked in its elevated position, the trencher 40 is maintained spaced from the ground while the lever 39 holds the shaft 30 elevated and the gears 34 and 35 out of mesh so that the axle 13 may rotate freely and carry therewith the gear 34 to the exclusion of the operation of the gear 35 and the feed block 19. The covering scoop 52 may be elevated to inoperative position by shifting the lever 56 with the subsequent operation of the lever 53. Also, the depth of planting may be regulated by the rise and fall of the tubular member 40 while a similar adjustment of the scoop 52 is possible.

While there is herein shown and described the preferred embodiment of the invention, it is nevertheless to be understood that minor changes may be made in the novel form, combination and arrangement of parts without departing from the spirit and scope of the invention, as hereinafter claimed.

What is claimed as new is:—

In a planting machine of the type described, a platform, a seed hopper supported thereon, a seed chute in communication with said hopper supported adjacent its lower end by an angular bracket carried by the underneath portion of the platform, a rotatable block within said hopper, for feeding seeds to the chute, a vertically movable shaft journaled beneath said platform and slidably keyed to said rotatable block, a lever pivotally carried by the angular bracket and underlying said shaft, a trencher slidably carried upon the seed chute having laterally extending arms upon its upper end and means engageable with said pivoted lever and the laterally extending arms upon the trencher for simultaneously elevating said vertical shaft and trencher.

In testimony whereof I affix my signature.

FRANK X. RATKOVIC.